United States Patent [19]

Aoyagi et al.

[11] Patent Number: 5,355,267
[45] Date of Patent: Oct. 11, 1994

[54] SUSPENSION ATTACHMENT APPARATUS FOR A DISK DRIVE

[75] Inventors: Akihiko Aoyagi, Yamato, Japan; Jerry T. Coffey, Oronoco, Minn.; Kiyoshi Satoh, Fujisawa, Japan

[73] Assignee: International Business Machines Corporation, Armonk, N.Y.

[21] Appl. No.: 137,395

[22] Filed: Oct. 14, 1993

Related U.S. Application Data

[63] Continuation of Ser. No. 846,846, Mar. 6, 1992, abandoned.

[30] Foreign Application Priority Data

Jul. 3, 1991 [JP] Japan ................................. 3-065360

[51] Int. Cl.⁵ .......................... G11B 5/49; G11B 21/20
[52] U.S. Cl. .................................................. 360/104
[58] Field of Search ..................... 360/104, 106; 29/603

[56] References Cited

U.S. PATENT DOCUMENTS

4,943,875  7/1990  Reidenbach et al. ............... 360/104
5,040,086  8/1991  Hibino ................................. 360/104

Primary Examiner—Robert S. Tupper
Attorney, Agent, or Firm—Roy W. Truelson; Matthew J. Bussan

[57] ABSTRACT

A suspension for a read/write head of a disk drive is fixed to a side wall of an arm. If two heads are to be suspended, a first suspension for one head and a second suspension for the other head are fixed to opposite side walls of the arm. Since the suspension is fixed to the side wall of the arm, there are no screw heads protruding or projections formed by hot staking on the top and the bottom surfaces of the arm and it is not necessary to make screw holes which extend from the top surface or the bottom surface into the arm perpendicularly to these surfaces. Thus, the vertical thickness of the head carriage assembly can be decreased.

9 Claims, 13 Drawing Sheets

SUSPENSION ATTACHMENT APPARATUS FOR A DISK DRIVE

This is a continuation application of U.S. Ser. No. 07/846,846, filed on Mar. 6, 1992, now abandoned.

FIELD OF THE INVENTION

This invention relates to a head carriage assembly for a disk drive which carries at least one head and is driven by a head positioning device for positioning the head to a target position on a disk.

BACKGROUND OF THE INVENTION

Figure 23:
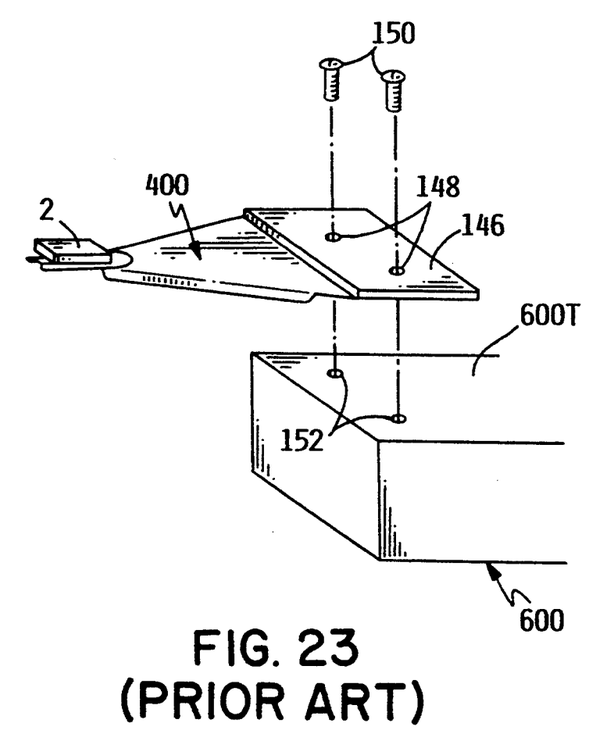
FIG. 23 is an exploded perspective view showing one example of a head suspension assembly according to prior art.

FIG. 23 is an exploded perspective view showing one example of a head carriage assembly according to prior art. In the head carriage assembly shown in the figure, a suspension 400 suspending a head slider 2 which contains a magnetic head at its one end, is fixed to the top surface of a rigid arm 600 made of aluminum die casting. The suspension 400 is fixed to the arm 600, through holes 148 made in mounting plate 146 for the suspension 400, by turning screws 150 into screw holes 152 formed on the top surface 600T of the arm 600. U.S. Pat. No. 4,167,765 discloses that the suspension is attached to the top surface of the rigid arm by screw.

Figure 24:
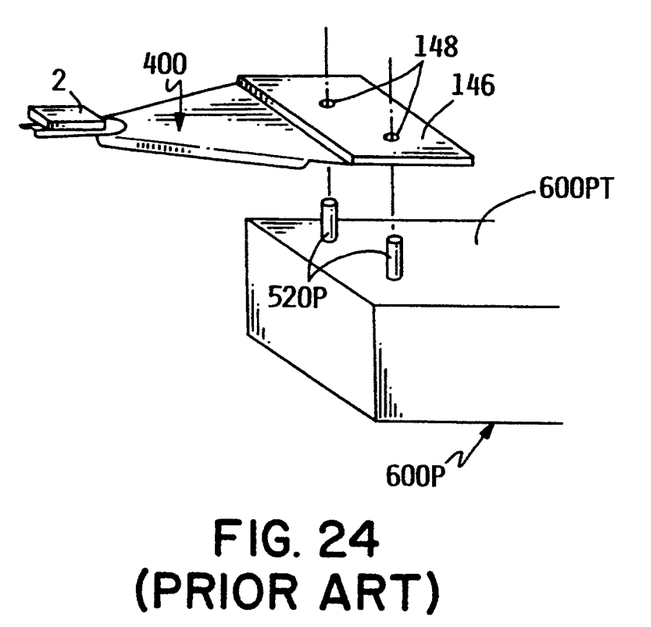
FIG. 24 is an exploded perspective view showing another example of a head suspension assembly according to prior art.

FIG. 24 is an exploded perspective view showing another example of a head carriage assembly according to prior art. In the example, a rigid arm 600P is made of plastic. On the top surface 600PT of the arm 600P, bosses 520P made of plastic are formed into a one-piece structure with the arm. The bosses 520P, which penetrate holes 148 in a mounting plate 146 for a suspension 400 and protrude from the mounting plate 146, are molten by hot staking, and are solidified in a state where cross sections parallel to the top surface 600PT of the arm 600P expand, and thus the suspension 400 is fixed to the arm 600P.

Figure 25:
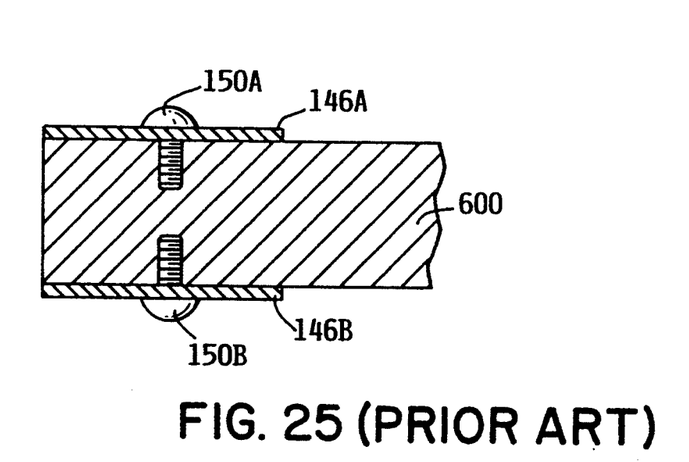
FIG. 25 is a transverse sectional view showing a head suspension assembly according to prior art in which the respective mounting plates for suspensions are fixed, by screws, to the top surface and the bottom surface of an arm.

As shown in FIG. 23, if the suspension 400 is fixed to the arm 600 by the screws 150, heads of the screws 150 protrude from the mounting plate 146. Accordingly, a space between disks or a distance between a head carriage assembly and a housing case cannot be reduced. Moreover, since the screw holes 152 made in the arm 600 need interior screw portions, there is a limit to reducing a thickness of the arm 600 itself. Particularly, as shown in FIG. 25, if a mounting plate 146A for a first suspension and a mounting plate 146B for a second suspension are fixed to the top surface and the bottom surface of an arm 600 by screws 150A and 150B, respectively, a thickness of the arm 600 must be set so that the bottom ends of the screws 150A and 150B do not come in touch with each other. This means that not only a thickness of the head carriage assembly but a thickness of a magnetic storage device cannot be reduced.

Figure 26:
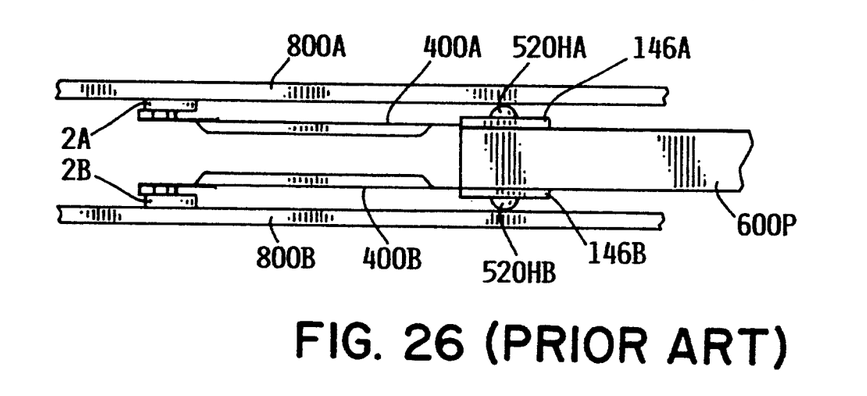
FIG. 26 is a side view showing a head suspension assembly according to prior art in which the respective mounting plates for suspensions are fixed, by hot staking, to the top surface and the bottom surface of an arm.

As shown in FIG. 24, if the suspension 400 is fixed to the arm 600P by hot staking, it becomes impossible to reduce a space between disks or a distance between a head carriage assembly and a housing case due to a projection produced by hot staking. Particularly, as in FIG. 26, if mounting plates 146A and 146B for suspensions 400A and 400B for suspending head sliders 2A and 2B, which contain respective magnetic heads are fixed, by hot staking, to the top and the bottom surfaces of an arm 600P, respectively, a space between magnetic disks 800A and 800B, which are read and written by the magnetic heads of the head sliders, must be increased so that projections 520HA and 520HB formed by hot staking do not contact the magnetic disks 800A and 800B.

Figure 27:
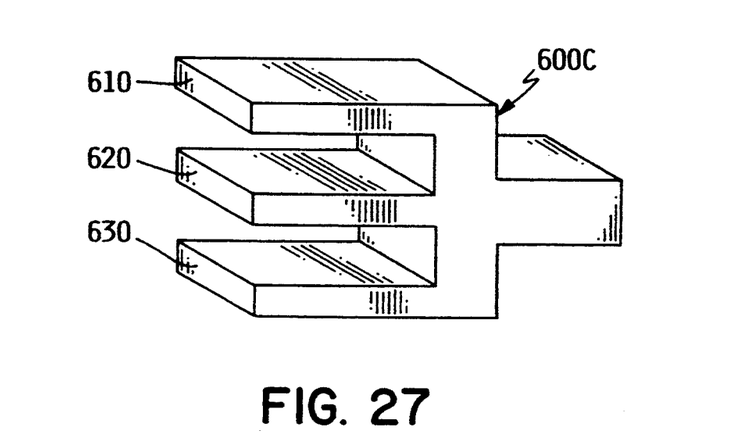
FIG. 27 is a perspective view of a comb-type arm assembly.

A method, shown in FIG. 23 and FIG. 24, for fixing the suspensions to the top surface and the bottom surface of the arm, cannot be applied to an intermediate arm 620 positioned between an upper arm 610 and a lower arm 630 of a comb-type arm assembly 600C shown in FIG. 27. The comb-type arm assembly is, for its high rigidity, suited for speeding up. Therefore, it would be a problem that the above method cannot be applied to the comb-type arm.

SUMMARY OF THE INVENTION

An object of the present invention is to provide a head carriage assembly with a reduced thickness.

According to the present invention, a suspension for suspending a head is fixed to a side wall of an arm. If two heads are to be suspended, a first suspension for suspending one head and a second suspension for suspending the other head are fixed to a first side wall and a second side wall of the arm, respectively.

As described above, since the suspension is fixed to the side wall of the arm, there are no screw heads protruding or projections formed by hot staking on the top and the bottom surfaces of the arm and it is not necessary to make screw holes which extend from the top surface or the bottom surface into the arm perpendicularly to these surfaces, that is, in the direction of a thickness of the arm. Thus the thickness of a head carriage assembly can be decreased. If two heads are suspended, since two suspensions are fixed to the two side walls of the arm respectively, it would be unnecessary to increase the vertical size of the side walls, that is, the thickness of the arm. Thus, the thickness of the head carriage assembly can be decreased.

DETAILED DESCRIPTION OF THE PREFERRED EMBODIMENT

Figure 1:
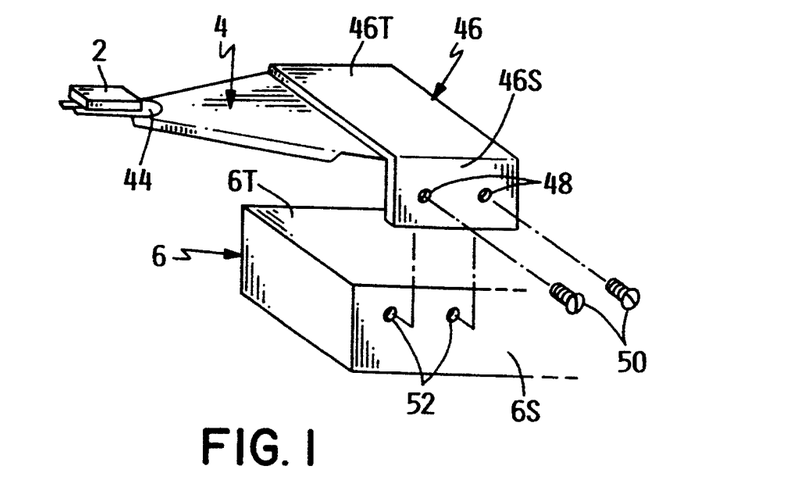
FIG. 1 is an exploded perspective view showing an embodiment of a head carriage assembly constructed in accordance with the present invention in which one suspension is fixed to an arm.

FIG. 1 is an exploded perspective view showing an embodiment of a head carriage assembly constructed in accordance with the present invention. Referring to FIG. 1, a suspension 4 which suspends a head slider 2 containing a magnetic head for reading/writing data from/to a magnetic disk (not shown) is fixed to a side wall 6S of a rigid arm 6 made of aluminum die casting joined to a head positioning device comprising a voice coil motor, etc. for positioning the magnetic head to a target track on the magnetic disk.

Figure 2:
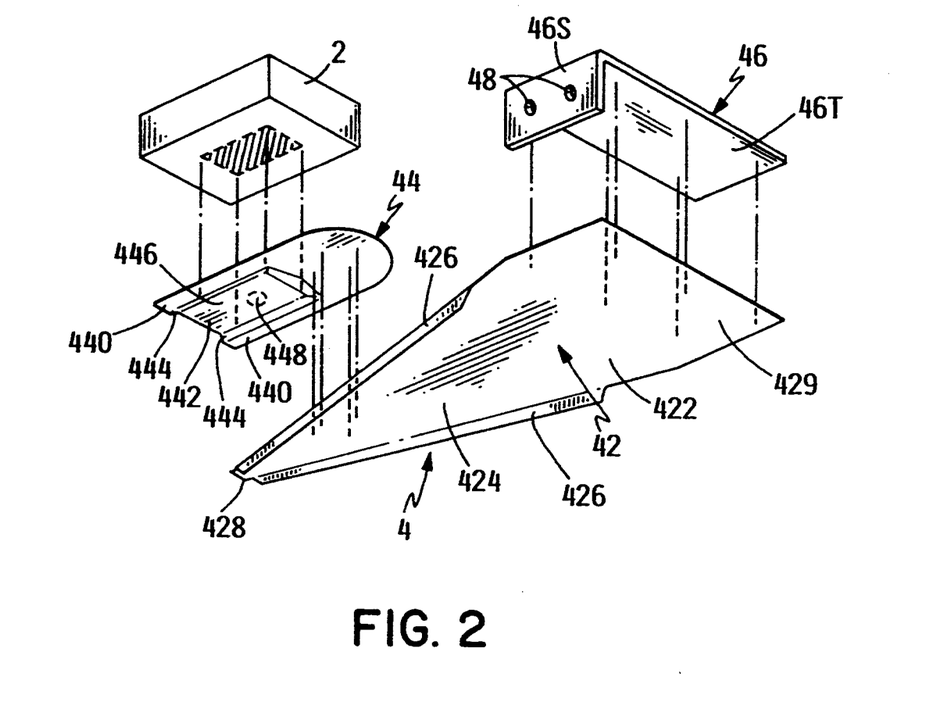
FIG. 2 is an exploded perspective view showing the details of a suspension load beam, a flexure, and a mounting plate that are the components of the suspension shown in FIG. 1.

The suspension 4, as shown in FIG. 2, includes a suspension load beam 42, a flexure 44, and a mounting plate 46. The suspension load beam 42, made of stainless steel, provides a resilient spring section 422 and a triangularly shaped load beam section 424. Flanges 426 are provided in both sides of the load beam section. In the neighborhood of the apex 428 of the triangular section of the load beam section 424, the flexure 44 is fixed by spot welding. The flexure 44 includes two flexible outer fingers 440 which run parallel to a longitudinal axis of the suspension load beam 42, a cross leg 442 having two offset sections 444 for forming a plane offset from the plane defined by the two flexible outer fingers 440, and a center tongue 446 which extends parallel to the fingers 440 from the above offset plane of the cross leg 442 and which has a free end. In the center tongue 446, a load protuberance 448 which contacts the free end of the suspension load beam 42, that is, the apex 428 of the triangular section, is formed. The head slider 2 is adhered and fixed, by an epoxy resin, to the center tongue 446 of the flexure 44. The suspension load beam 42, the flexure 44, and head slider 2 are described in more detail in U.S. Pat. No. 4,167,765 and hence further discussion is omitted.

A cross section of the arm 6 in the transverse direction (that is, in the direction perpendicular to the longitudinal axis of the suspension 4) is a rectangle. The mounting plate 46, which forms a part of the suspension 4, includes a first mounting section 46T parallel to the top surface 6T of the arm 6 and a second mounting section 46S parallel to the side wall 6S of the arm 6, and has an L-shaped cross section in the transverse direction of the arm 6. The first mounting section 46T is fixed, by spot welding, to a section 429 extended from the resilient spring section 422 of the suspension load beam 42. Through the second mounting section 46S, two holes 48 are bored, and in the side wall 6S of the arm 6, two screw holes 52 are made at positions corresponding to two holes bored through the second mounting section 46S of the suspension 4. Two screws 50, through two holes 48 which penetrate the second mounting section 46S, are screwed in the screw holes 52 in the arm 6 to fasten the suspension 4 to the side wall 6S of the arm 6.

Figure 3A:
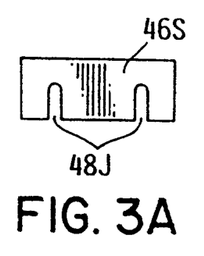
FIGS. 3A–3C are a side view showing examples of modification for the second mounting section of the mounting plate for the suspension shown in FIG. 1 and FIG. 2.
Figure 3B:
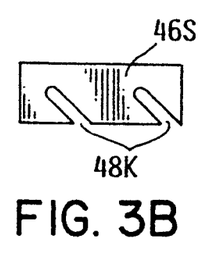
Figure 3C:
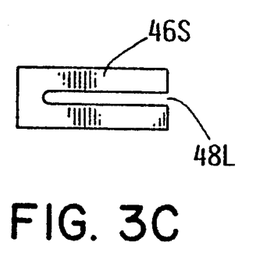

In the embodiment shown in FIG. 1, the second mounting section 46S of the suspension 4 is penetrated by the two holes 48. However, it will be appreciated that instead of making the penetrating holes 48, two slits 48J which extend in the vertical direction can be provided, as shown in FIG. 3(a). It will also be appreciated that two slits 48K can be cut diagonally, as shown in FIG. 3(b). It will also be appreciated that a slit 48L can be cut horizontally, as shown in FIG. 3(c). If the slits 48J, the slits 48K, or the slit 48L are provided, the screws 50 can be first screwed in the screw holes 52 loosely and then the mounting plate 46 of the suspension 4 can be positioned.

Figure 4:
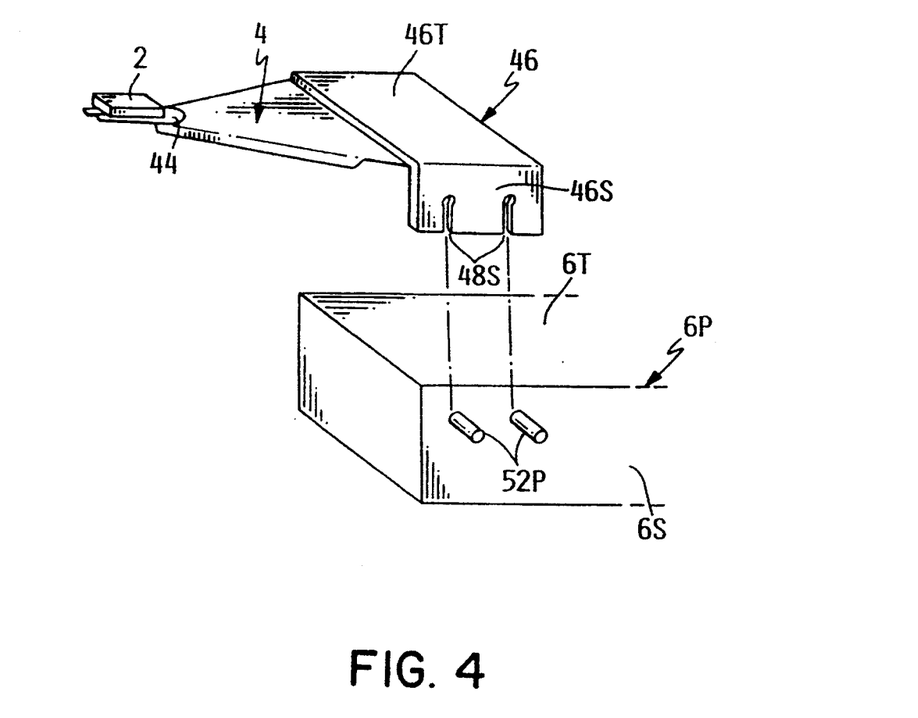
FIG. 4 is an exploded perspective view showing another embodiment of a head carriage assembly constructed in accordance with the present invention in which one suspension is fixed to an arm.
Figure 5:
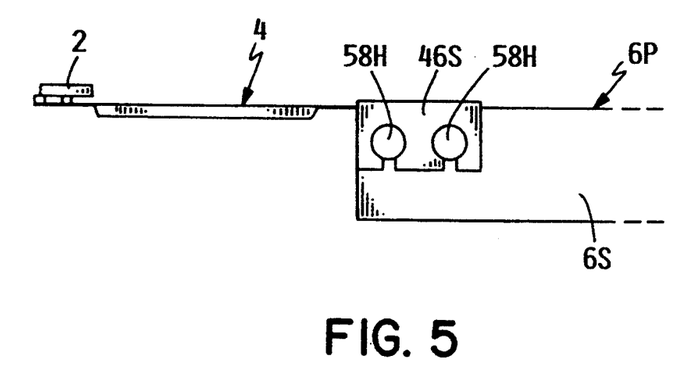
FIG. 5 is a side view showing a state where the suspension for the head carriage assembly shown in FIG. 4 is fixed, by hot staking, to a side wall of the arm.

FIG. 4 is an exploded perspective view showing another embodiment of a head carriage assembly constructed in accordance with the present invention. The head carriage assembly is the same as the head carriage assembly shown in FIG. 1 in that the suspension 4 which suspends the head slider 2 is fixed to a side wall 6S of a rigid arm 6P, but is different from the head carriage assembly shown in FIG. 1 in that the rigid arm 6P is made of plastic and the suspension 4 is fixed to the arm 6P by hot staking. More particularly, two slits 48S are formed in a second mounting section 46S for the suspension 4; two bosses 52P made of plastic are formed into a one-piece structure with the rigid arm 6P at positions corresponding to the slits 48S on the side wall 6S of the arm 6P. The bosses 52P, which penetrate the slits 48S and protrude from the second mounting section 46S, are made molten by hot staking, and are solidified in a state where heads 52H whose cross sections parallel to the side wall 6S of the arm 6P expand, are formed as shown in FIG. 5, and thus the suspension 4 is fixed to the side wall 6S of the rigid arm 6P.

Figure 6:
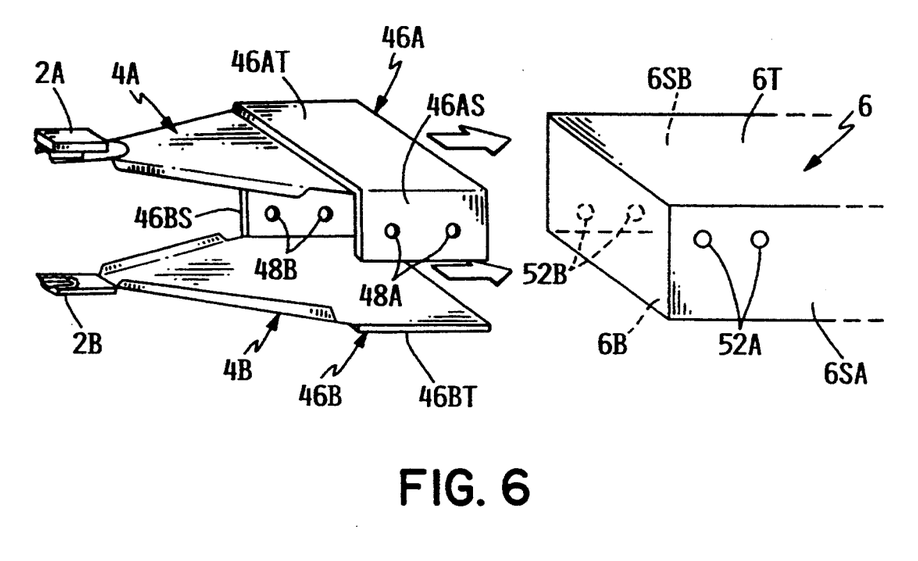
FIG. 6 is at, exploded perspective view showing an embodiment of a head carriage assembly constructed in accordance with the present invention in which two suspensions are fixed to an arm.
Figure 7:
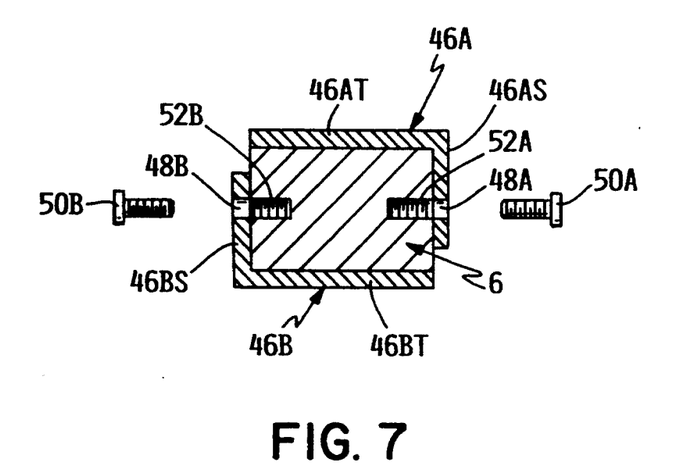
FIG. 7 is a cross-sectional view showing a cross section, in the transverse direction, of the head carriage assembly shown in FIG. 6.

FIG. 6 and FIG. 7 are exploded perspective views showing an embodiment of a head carriage assembly constructed in accordance with the present invention wherein two heads are carried by an arm. In the head carriage assembly, a first suspension 4A and a second suspension 4B which suspend head sliders 2A and 2B containing a first magnetic head and a second magnetic head, respectively, are fixed to side walls 6SA and 6SB, respectively, of a rigid arm 6 made of aluminum die casting. A cross section of the arm 6 in the transverse direction is a rectangle. The first suspension 4A comprises an L-shaped mounting plate 46A including a first mounting section 46AT and a second mounting section 46AS parallel to the top surface 6T and the first side wall 6SA of the arm 6, respectively. Through the second mounting section 46AS, two holes 48A are bored; and in the first side wall 6SA of the arm 6, two screw holes 52A are made at positions corresponding to the two holes 48A bored through the second mounting section 46AS. Two screws 50A (not shown in FIG. 6; only one of them shown in FIG. 7), through the two holes 48A which penetrate the second mounting section 46AS, are screwed in the screw holes 52A in the arm 6 to fasten the suspension 4A to the first side wall 6SA of the arm 6. The second suspension 4B comprises an L-shaped mounting plate 46B including a first mounting section 46BT and a second mounting section 46BS parallel to the bottom surface 6B and the second side wall 6SB of the arm 6, respectively. Through the second mounting section 46BS, two holes 48B are bored; and in the second side wall 6SB of the arm 6, two screw holes 52 are made at positions corresponding to the two holes 48B bored through the second mounting section 46BS. Two screws 50B (not shown in FIG. 6; only one of them shown in FIG. 7), through the two holes 48B which penetrate the second mounting section 46BS, are screwed in the screw holes 52B in the arm 6 to fasten the suspension 4B to the second side wall 6SB of the arm 6.

Figure 8:
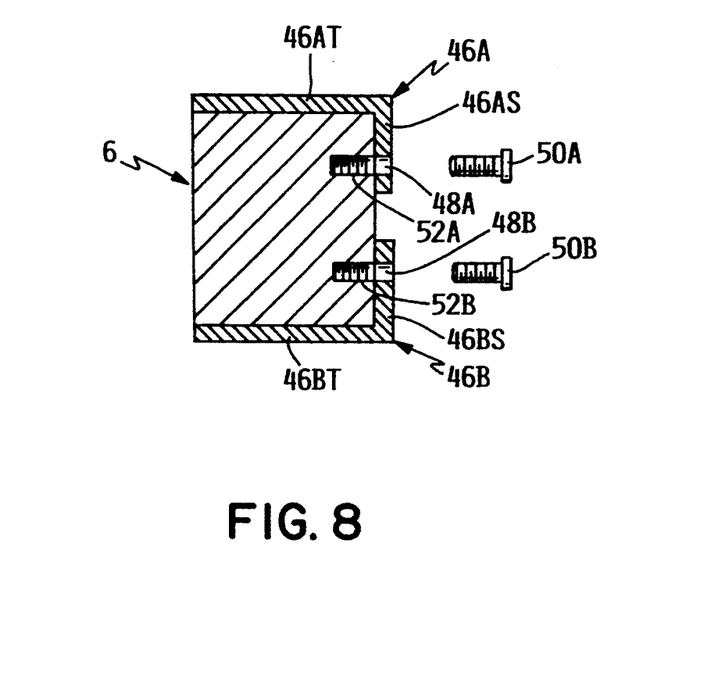
FIG. 8 is a cross-sectional view showing a state where two suspensions are fixed to one side wall of an arm.

As shown in FIG. 6 and FIG. 7, by fixing the two suspensions 4A and 4B to the two different side walls 6SA and 6SB of the arm 6, in other words, by fixing the L-shaped mounting plates 46A and 46B for the suspensions 4A and 4B to the arm 6 in point symmetrical positions with respect to the central axis of the arm 6, a thickness of the arm 6 can be decreased. As shown in FIG. 8, if the second mounting sections 46AS and 46BS for the suspensions 4A and 4B are fixed to only one side wall, for example, 6SA of the arm 6, a thickness of the arm 6 would be increased. In the embodiment shown in FIG. 6 and FIG. 7, two suspensions are fixed to the arm by the screws. However, it will be recognized that two suspensions, by the art shown in FIG. 4, can be fixed to the arm by hot staking.

Figure 9:
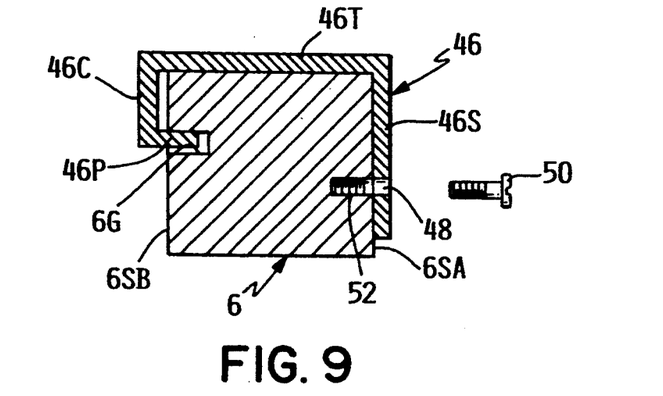
FIG. 9 is a cross-sectional view showing another embodiment in which improvements have been made to the mounting plate for the suspension and the arm in the embodiment shown in FIG. 1 to insure the fixing of the mounting plate to the arm.
Figure 10:
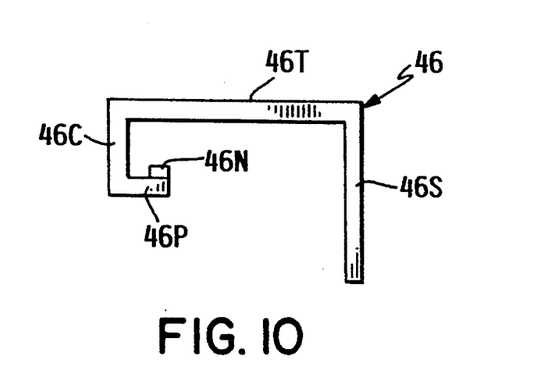
FIG. 10 is a front view showing an example of the improvement to the mounting plate shown in FIG. 9.
Figure 11:
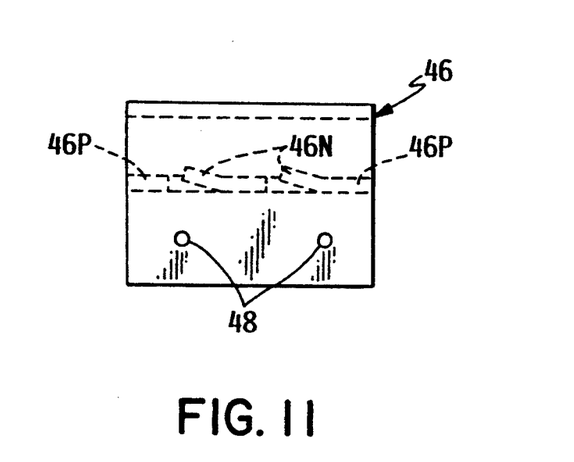
FIG. 11 is a side view of the mounting plate shown in FIG. 10.
Figure 12:
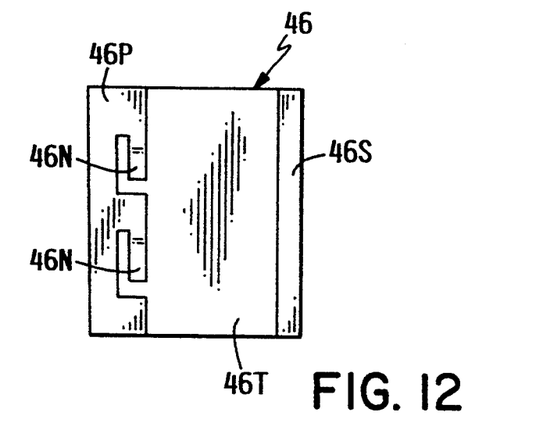
FIG. 12 is a bottom plan view of the mounting plate shown in FIG. 10.
Figure 13:
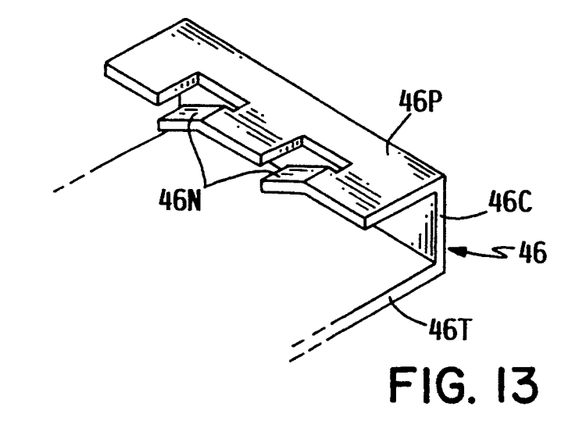
FIG. 13 is a perspective view of the mounting plate shown in FIG. 10.

In a case where fixing only the second mounting section 46S (or 46AS and 46BS) of the mounting plate 46 (or 46A and 46B) for the suspension 4 (or 4A and 4B) to the side wall 6S (or 6SA and 6SB) as shown in FIG. 1 to FIG. 7 is not sufficient to fix the mounting plate 46, and thus the mounting plate 46 may rise above the surface of the arm, it is preferable to form a groove 6G, which runs parallel to a longitudinal axis of the arm 6, in the second side wall 6SB opposite to the first side wall 6SA of the arm 6, to which the second mounting section 46S of the mounting plate 46 provided for the suspension 4 is fixed, and to provide the mounting plate 46T with a third mounting section 46C having a projecting section 46P which engages with the channel 6G to ensure that the mounting plate 46 is fastened to the arm 6, as shown in FIG. 9.

To prevent the projecting section 46P of the mounting plate 46 from easily getting out of the groove 6G of the arm 6, two claws 46N bent from the projecting section 46P can be provided as shown in FIG. 10, FIG. 11, FIG. 12, and FIG. 13. The resiliency of the claws 46N ensure that the mounting plate 46 can be fixed to the arm 6. The number of the claws 46N may be changed according to need.

Figure 14:
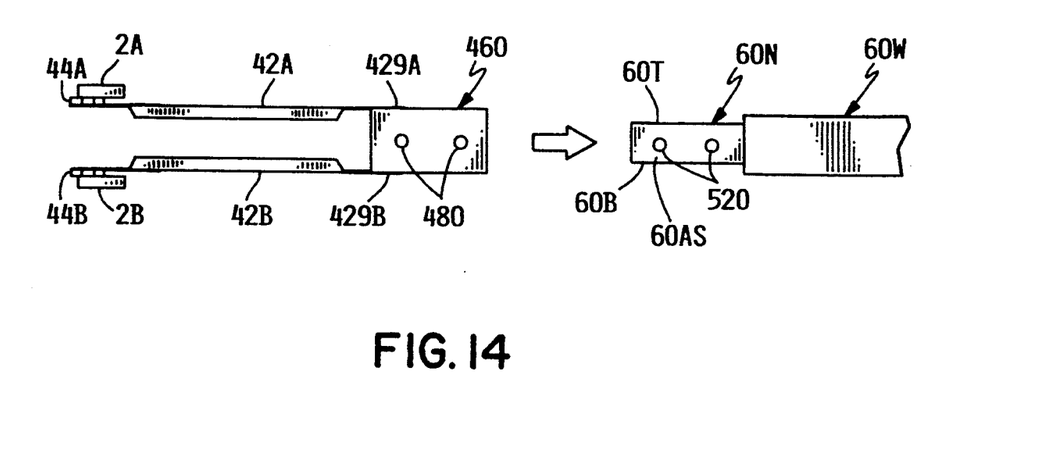
FIG. 14 is a side view showing another embodiment of a head carriage assembly constructed in accordance with the present invention in which two suspensions are fixed to an arm.
Figure 15:
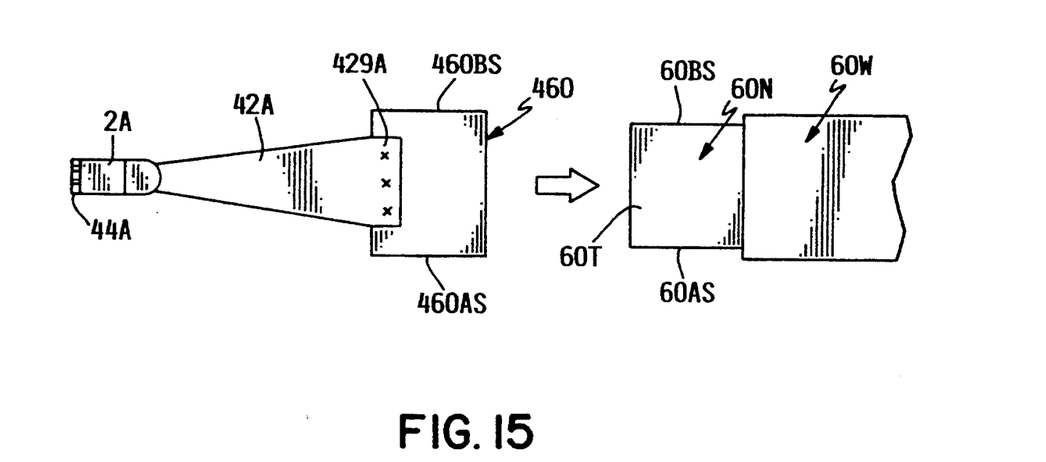
FIG. 15 is a top plan view of the head carriage assembly shown in FIG. 14.
Figure 16:
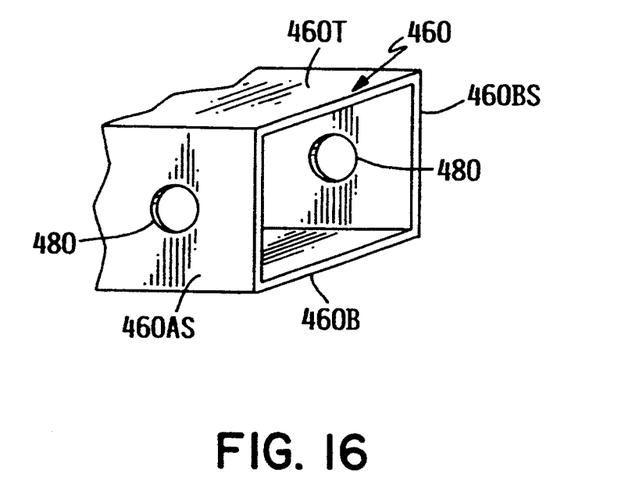
FIG. 16 is a fragmentary perspective view showing the box-type mounting plate of the head carriage assembly shown in FIG. 14.

FIG. 14, FIG. 15, and FIG. 16 are a side view, a top view, and a fragmentary perspective view, respectively, showing another embodiment of a head carriage assembly constructed in accordance with the present invention wherein two heads are carried by an arm. Referring to FIG. 14 and FIG. 15, head sliders 2A and 2B are the same as the head slider 2 shown in FIG. 2, suspension load beams 42A and 42B are the same as the suspension load beam 42 in FIG. 2, and, likewise, flexures 44A and 44B are the same as the flexure 44 in FIG.2. The suspension load beam 42A, the flexure 44A, and the head slider 2A are arranged, like the construction of FIG. 2, so that the flanges 426 face downward and the center tongue 446 is put above the outer fingers 440. The suspension load beam 42B, the flexure 44B, and the head slider 2B are arranged, contrary to the construction of FIG. 2, so that the flanges 426 face upward and the center tongue 446 is put below the outer fingers 440; that is, the head sliders 2A and 2B are placed back to back with each other.

An extending section 429A of the suspension load beam 42A is fixed to the top surface 460T of a box-type mounting plate 460 made of stainless steel, by spot welding. An extending section 429B of the suspension load beam 42B is fixed to the bottom surface 460B of the box-type mounting plate 460 by spot welding. The box-type mounting plate 460 has not only the above top surface 460T and the above bottom surface 460B but also two side walls 460AS and 460BS. A rigid arm, made of aluminum die casting, includes a first arm section 60W and a second arm section 60N whose width is less than that of the first arm section 60W which is a base part. The second arm section 60N is a part to which the box-type mounting plate 460 is fixed. The second arm section 60N has a cross section of a rectangle in the transverse direction. The top surface 460T, the bottom surface 460B, and the two side walls 460AS and 460BS of the box-type mounting plate 460 are parallel to the top surface 60T, the bottom surface 60B, and the two side walls 60AS and 60BS, respectively, of the second arm section 60N. Through the two side walls 460AS and 460BS of the box-type mounting plate 460, two respective holes 480 are made; on the other hand, in the two side walls 60AS and 60BS of the second arm section 60N, screw holes 520 are made at positions corresponding to the holes 480 made through the box-type mounting plate 460. The second arm section 60N is inserted into the box-type mounting plate 460, and then 4 screws (not shown) are, through the holes 480 which penetrate through the mounting plate 460, screwed in the respective screw holes in the second arm section 60N. Thus, the suspension load beams 42A and 42B are fastened to the side walls 60AS and 60BS of the second arm section 60N.

Figure 17:
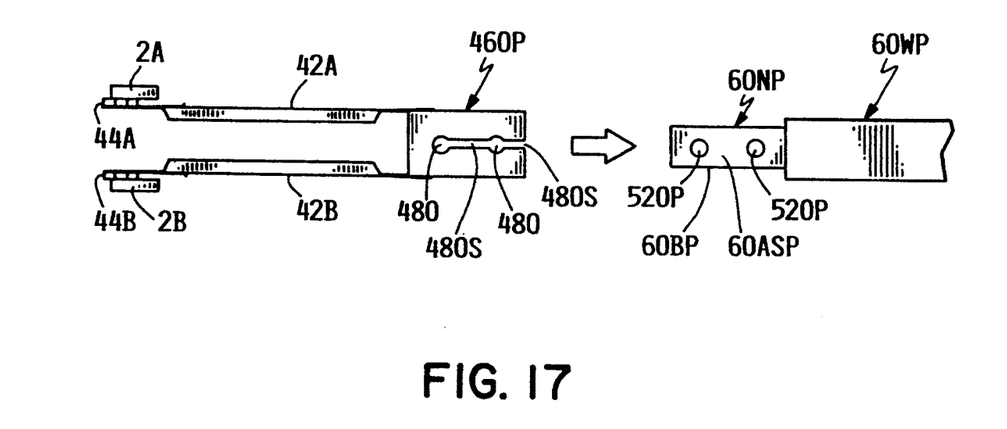
FIG. 17 is a side view showing still another embodiment of a head carriage assembly constructed in accordance with the present invention in which two suspensions are fixed to an arm.
Figure 18:
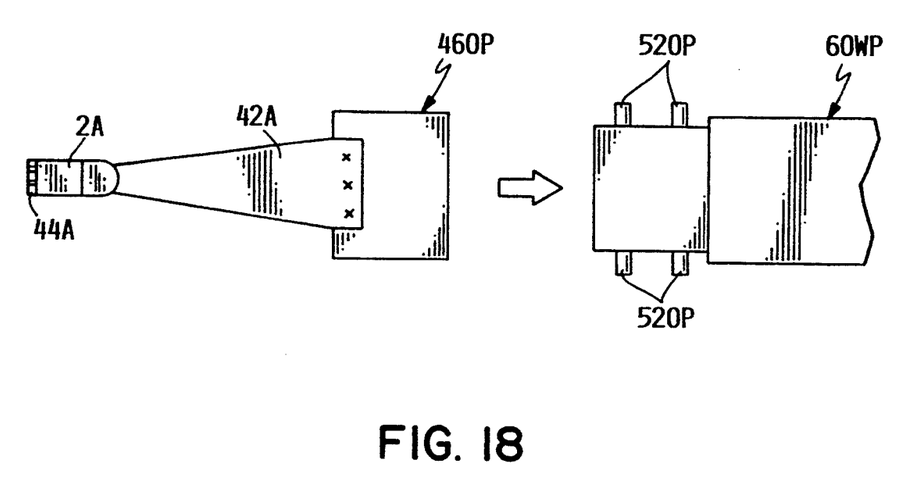
FIG. 18 is a top plan view of the head carriage assembly shown in FIG. 17.
Figures 19, 20:
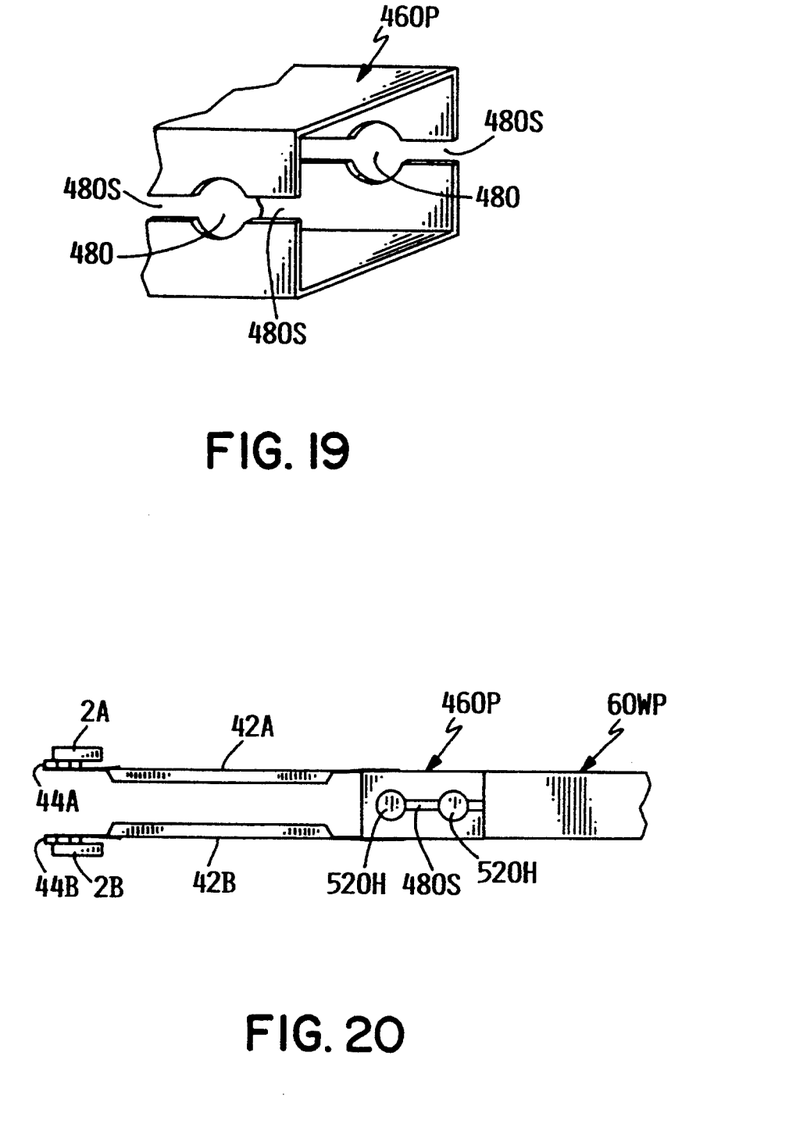
FIG. 19 is a fragmentary perspective view showing the box-type mounting plate of the head carriage assembly shown in FIG. 17.
FIG. 20 is a side view showing a state where the box-type mounting plate for the suspension of the head carriage assembly shown in FIG. 17 has been fixed, by hot staking, to the arm.

FIG. 17, FIG. 18, and FIG. 19 are a side view, a top view, and a fragmentary perspective view, respectively, showing still another embodiment of a head carriage assembly constructed in accordance with the present invention wherein two heads are carried by an arm. The embodiment is the same as the embodiment shown in FIG. 14 to FIG. 16 in that a suspension load beam is fixed to the side walls of a rigid arm through a box-type mounting plate, but is different from the embodiment shown in FIG. 14 to FIG. 16 in that a rigid arm, that is, a first arm section 60WP and a second arm section 60NP are made of plastic and a box-type mounting plate 460P is fixed to the second arm section 60NP by hot staking. More particularly, in the two side walls of the box-type mounting plate 460P, slits 480S extending from two respective penetrating holes 480 are formed; on the other hand, on the two side walls of the second arm section 60NP, two bosses 520P made of plastic are formed into a one-piece structure with the second arm section 60NP at positions corresponding to the holes 480 of the box-type mounting plate 460P. The bosses 520P, which penetrate the holes 480 and protrude from the side of the box-type mounting plate 460P, are made molten by hot staking, and are solidified, as shown in FIG. 20, in a state where heads 520H, whose cross sections parallel to the side of the box-type mounting plate 460P expand, are formed. Thus, the suspension load beams 42A and 42B are fixed to the side wall of the second arm section 60NP.

In the embodiment shown in FIG. 14 to FIG. 16 and the embodiment shown in FIG. 17 to FIG. 20, both sides of the box-type mounting plate 460 (or 460P) are fixed to both side walls of the second arm section 60N (or 60NP). However, it will be appreciated that only one side of the box-type mounting plate 460 (or 460P) can be fixed to a corresponding side wall of the second arm section 60N (or 60NP). It will be appreciated also that the box-type mounting plate 460 (or 460P) may support only one suspension load beam (that is, only one slider).

Figure 21:
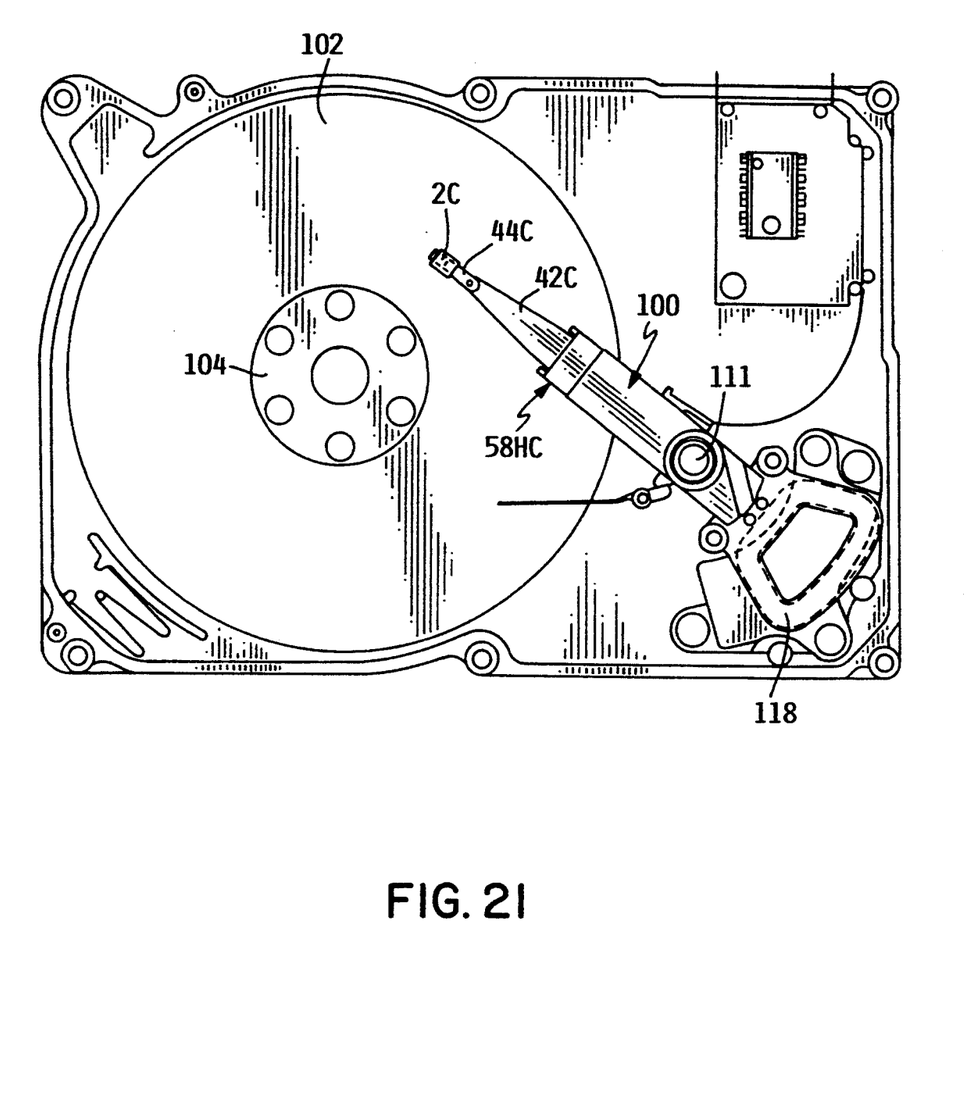
FIG. 21 is a top plan view showing an embodiment of a magnetic hard disk device according to the present invention.
Figure 22:
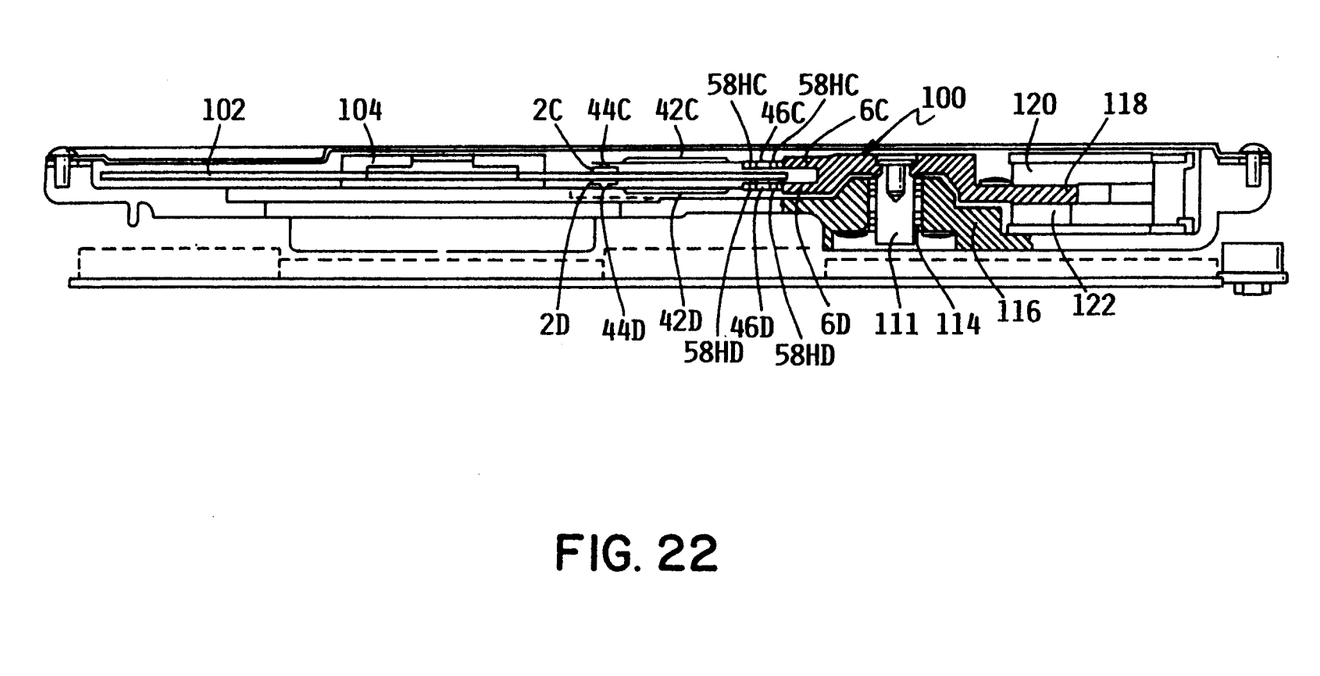
FIG. 22 is a side view of the magnetic hard disk device shown in FIG. 21.

FIG. 21 and FIG. 22 are a top view and a side view, respectively, showing an embodiment of a magnetic hard disk device constructed in accordance with the present invention wherein a suspension for supporting a head is fixed to a side of an arm. A head carriage assembly 100 comprises head sliders 2C and 2D including magnetic heads for reading data from or writing data to the front surface or back surface of a magnetic hard disk 102, flexures 44C and 44D for suspending the sliders 2C and 2D, respectively, suspension load beams 42C and 42D for suspending the flexures 44C and 44D, respectively, and mounting plates 46C and 46D for attaching the suspension load beams 42C and 2D to rigid arms 6C and 6D, respectively. The head sliders 2C and 2D are the same as the head slider 2 shown in FIG. 2, the flexures 44C and 44D are the same as the flexure 44 in FIG. 2, the mounting plates 46C and 46D are the same as the mounting plate 46 in FIG. 4, and the sections of the arms 6C and 6D to which the mounting plates 46C and 46D are attached, respectively, are the same as the arm 6P in FIG. 4.

The head slider 2C, the flexure 44C, and the suspension load beam 42C are arranged so that the center tongue of the flexure 44C is put below the outer fingers, the flanges of the beam 42C face upward, and the first mounting section of the mounting plate 46C is mounted to the top surface of the arm 6C. The head slider 2D, the flexure 44D, and the suspension load beam 42D are arranged so that the center tongue of the flexure 44D is put above the outer fingers, the flanges of the beam 42D face downward, and the first mounting section of the mounting plate 46D is mounted to the bottom surface of the arm 6D. The second mounting sections of the mounting plates 46C and 46D are fixed, by hot staking, to the side walls of the arms 6C and 6D, respectively. In FIG. 21 and FIG. 22, reference symbols 58HC and 58HD indicate the heads of the same bosses as the bosses 52P shown in FIG. 4, which have been molten, expanded, and solidified.

The magnetic hard disk 102 is driven, through a spindle 104, by a spindle motor 106. The head carriage assembly 100 is fixed to a shaft 111. The shaft 111 is mounted, through bearings 114, to a housing base 116 so that the head carriage assembly 100 can pivot with respect to the central axis of the shaft 111. The attachment of the head carriage assembly 100 to the shaft 111 follows a conventional method in which screw holes made in the shaft 111 and bolts are used. To the opposite side, with respect to the central axis of the shaft 111, of the side to which the head sliders 2C and 2D of the head carriage assembly 100 are mounted, a coil 118 is fixed. Above the coil 118 a permanent magnet 120 is disposed at a predetermined distance from the coil 118; on the other hand, below the coil 118 a permanent magnet 122 is disposed at a predetermined distance from the coil 118. The coil 118 and the permanent magnets 120 and 122 construct a voice coil motor, that is, a head positioning device. A current flowing in the coil 118 and a magnetic field produced by the permanent magnets 120 and 122 cause magnetic forces which drive the head carriage assembly 100 with respect to the central axis of the shaft 111.

In the magnetic disk device shown in FIG. 21 and FIG. 22, one suspension is attached to one arm. However, it will be appreciated that it is clear for those skilled in the art that a magnetic disk device including a head carriage assembly in which two suspensions are attached to an arm, as shown in FIG. 6 and FIG. 7, FIG. 14 to FIG. 16, or FIG. 17 to FIG. 20, can be implemented. It will be appreciated also that it is clear for those skilled in the art that the number of arms to which suspensions are fixed is not limited and a suspension can be attached also to the intermediate arm 620 of the comb-type arm assembly 600C shown in FIG. 27.

In the above embodiment, the mounting plate provided for the suspension is fixed, by screws or hot staking, to the arm. However, it will be appreciated that instead of screws or hot staking, welding, pressurizing, and spring force can be used.

As is obvious from the above description, according to the present invention, a projection for fixing a suspension to an arm is not formed on the top surface or the bottom surface of the arm because suspension is fixed to a side wall of the arm, and working, for example, making screw holes, for fixing the suspension in the direction of the thickness of the arm is not needed, thus the thickness of a head carriage assembly can be decreased. Further, if two heads are supported, it is unnecessary to increase the thickness of an arm because two suspensions are fixed to two respective side walls of the arm, thus the thickness of a head carriage assembly can be decreased.

What is claimed is:

1. A head carriage assembly which carries at least one head, and which is driven by a head positioning means so that said head is positioned at a target position on a disk rotating about an axis and lying in a plane perpendicular to said axis, said head carriage assembly comprising:
   a rigid arm having rectangular cross section, said rigid arm including a first side surface substantially perpendicular to said plane of said disk, a top surface substantially parallel to said plane of said disk, and a bottom surface substantially parallel to said plane of said disk;
   a suspension for suspending said head; and
   a generally L-shaped mounting plate for attaching the suspension to the rigid arm, said mounting plate having a first portion which is attached to said first surface of said rigid arm and a second portion which engages one of said top surface and said bottom surface of said rigid arm.

2. The head carriage assembly according to claim 1, wherein:
   said rigid arm has a second side surface substantially perpendicular to said plane of said disk having a groove therein;
   said generally L-shaped mounting plate having a third portion which engages with the groove of said rigid arm, said third portion forming a second attachment of said mounting plate to said rigid arm.

3. The head carriage assembly according to claim 2, wherein said third portion of the generally L-shaped mounting plate comprises a claw member.

4. The head carriage assembly according to claim 3, wherein said claw member is resilient.

5. A head carriage assembly which carries at least two heads, and which is driven by a head positioning means so that said head is positioned at a target position on a disk rotating about an axis and lying in a plane perpendicular to said axis, said head carriage assembly comprising:
   an arm having a first side surface substantially perpendicular to said plane of said disk, and a second side surface substantially perpendicular to said plane of said disk;
   a first suspension for suspending one of the two heads;
   a first generally L-shaped mounting plate for attaching said first suspension to said arm;
   a second suspension for suspending the other of the two heads;
   a second generally L-shaped mounting plate for attaching said second suspension to said arm;
   wherein said first mounting plate and said second mounting plate are fixed to said first side surface and said second side surface of said arm, respectively.

6. The head carriage assembly according to claim 5, wherein said arm includes a central axis and wherein said first and second mounting plates are arranged in point symmetrical positions with respect to the central axis of said arm.

7. The head carriage assembly according to claim 5, wherein:
   said arm further includes a top surface substantially parallel to said plane of said disk and a bottom surface substantially parallel to said plane of said disk;
   said first generally L-shaped mounting plate includes a mounting section parallel to the top surface of said arm and a mounting section parallel to said first side surface of said arm; and
   said second generally L-shaped mounting plate includes a mounting section parallel to the bottom surface of said arm and a mounting section parallel to said second side surface of said arm.

8. A disk drive apparatus comprising:
   at least one disk rotatable about an axis and lying in a plane perpendicular to said axis;
   a motor for driving said disk;
   a head carriage assembly comprising:
      (a) a first head,
      (b) an arm having a plurality of longitudinal surfaces, one of said plurality of longitudinal surfaces being a first side surface substantially perpendicular to said plane of said disk, another of said plurality of longitudinal surfaces being a second side surface substantially perpendicular to said plane of said disk,
      (c) a first suspension, said first head being mounted at a predetermined position on said first suspension,
      (d) a second head
      (e) a second suspension said second head being mounted at a predetermined position on said second suspension,
      (f) a first mount plate for attaching said first suspension to said arm, wherein said first mount plate is fixed to said first side surface of said arm, and
      (g) a second mount plate for attaching said second suspension to said arm, wherein said second mount plate is fixed to said second side surface of said arm; and
   a head positioning means for driving said head carriage assembly to position said head to a target position on said disk.

9. The disk drive apparatus of claim 8, wherein said head carriage assembly comprises a plurality of first and second heads, a plurality of arms, each said arm having a first and a second side surface, plurality of first and second suspensions, and a plurality of first and second mount plates, each said first mount plate being fixed to a respective first side surface of a respective one of said plurality of arms, each said first head being mounted on a respective one of said plurality of first suspensions at a predetermined position, and each said second mount plate being fixed to a respective second side surface of a respective one of said plurality of arms, each said second head being mounted on a respective one of said plurality of second suspensions at a predetermined position.

* * * * *